No. 673,424. Patented May 7, 1901.
D. T. DENTON.
HARVESTER.
(Application filed Aug. 2, 1899. Renewed Oct. 11, 1900.)
(No Model.) 4 Sheets—Sheet 1.
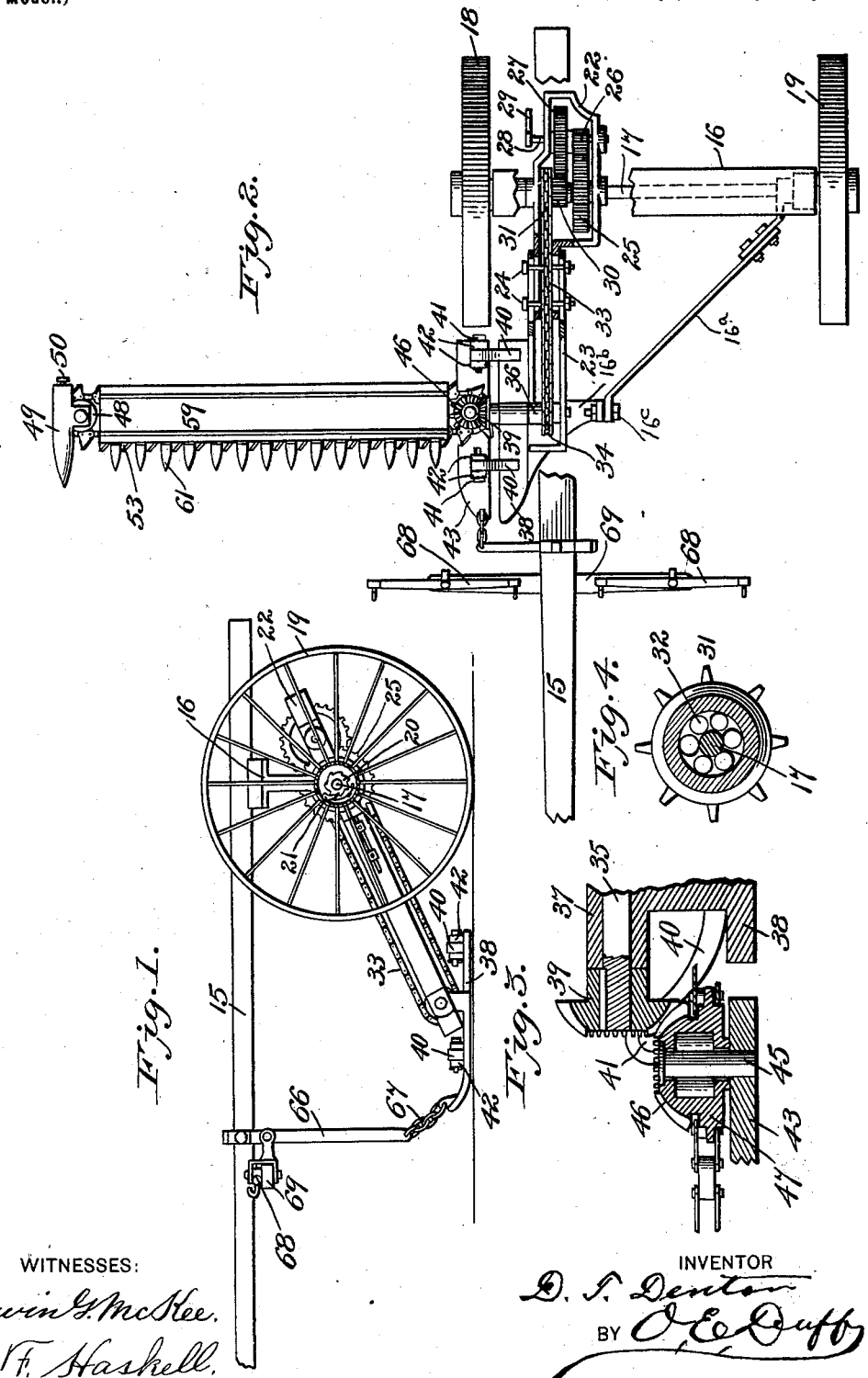
WITNESSES:
Edwin G. McKee.
M. F. Haskell.
INVENTOR
D. T. Denton
BY J. E. Duff
ATTORNEY.

No. 673,424. Patented May 7, 1901.
D. T. DENTON.
HARVESTER.
(Application filed Aug. 2, 1899. Renewed Oct. 11, 1900.)

(No Model.) 4 Sheets—Sheet 2.

No. 673,424. Patented May 7, 1901.
D. T. DENTON.
HARVESTER.
(Application filed Aug. 2, 1899. Renewed Oct. 11, 1900.)
(No Model.) 4 Sheets—Sheet 3.
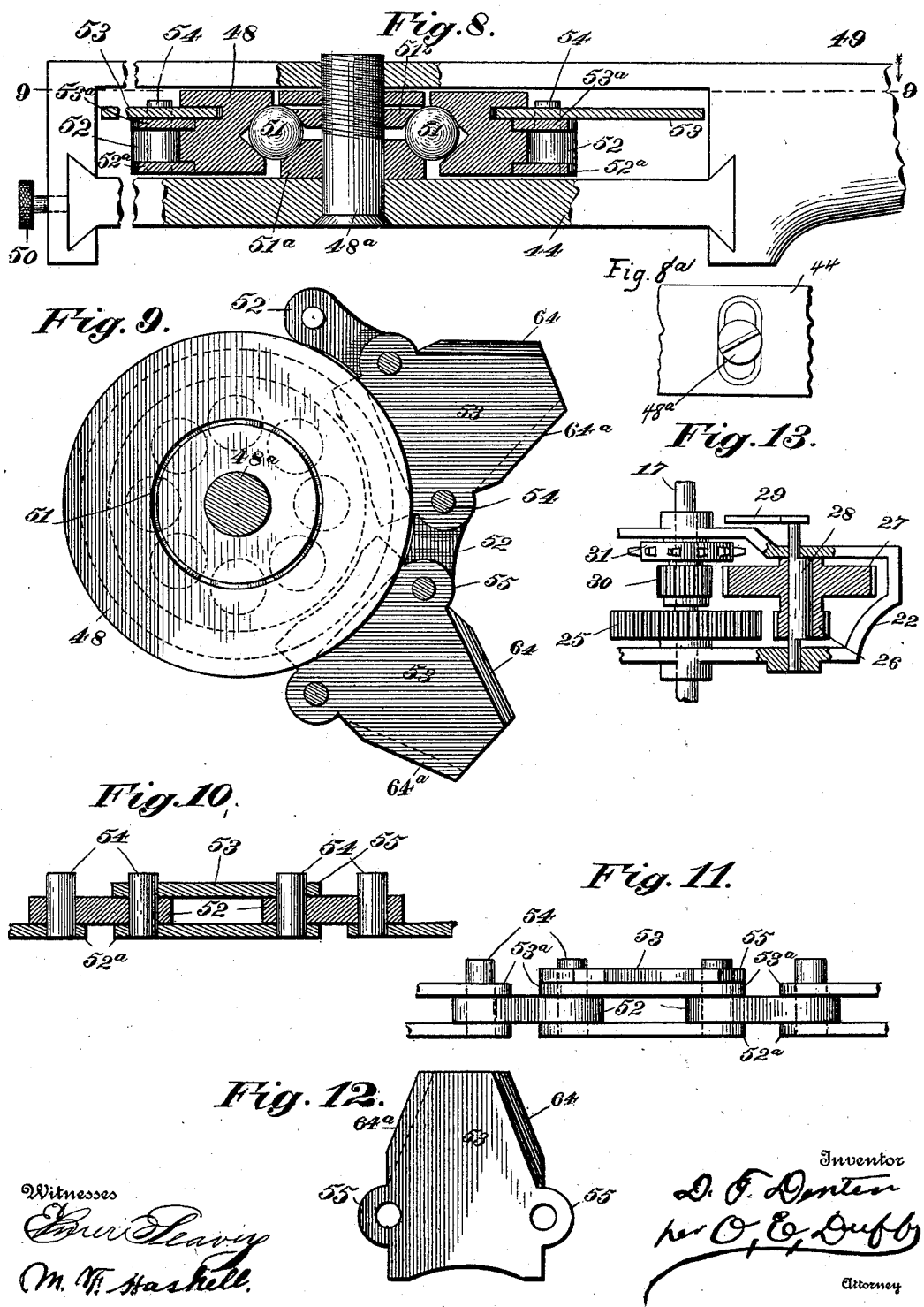

No. 673,424. Patented May 7, 1901.
D. T. DENTON.
HARVESTER.
(Application filed Aug. 2, 1899. Renewed Oct. 11, 1900.)
(No Model.) 4 Sheets—Sheet 4.
Fig. 14.
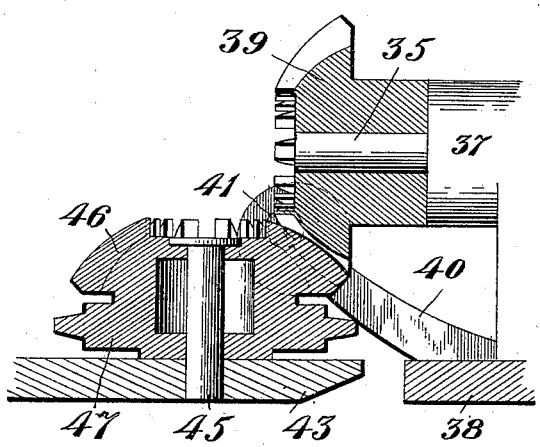
Fig. 15.
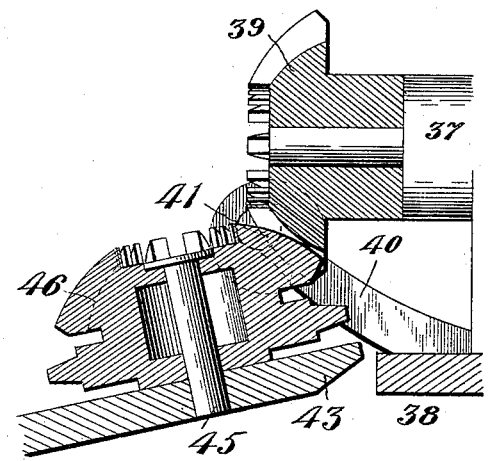
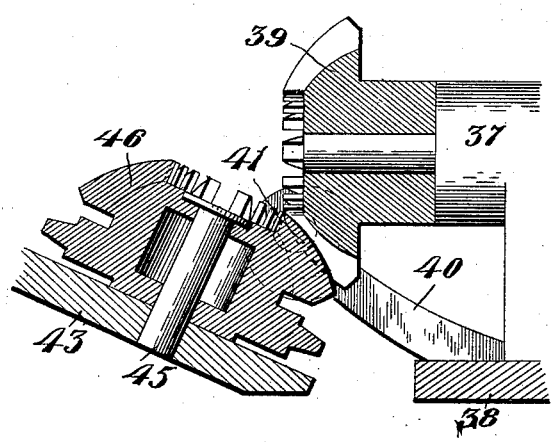
Fig. 16.
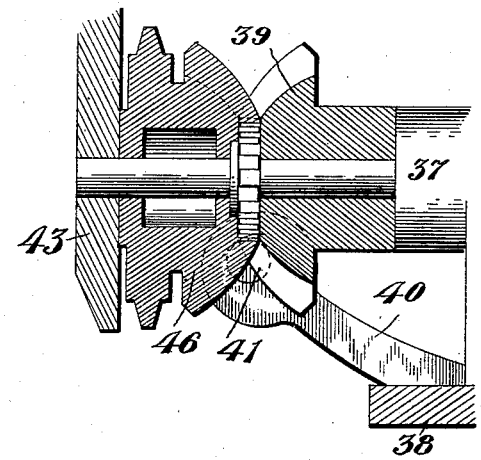
Fig. 17.
Witnesses:
Hugh Duffy
E. E. Duffy
Inventor:
D. T. Denton
per O. E. Duffy
Attorney.
THE NORRIS PETERS CO., PHOTO-LITHO., WASHINGTON, D. C.

UNITED STATES PATENT OFFICE.

DANIEL T. DENTON, OF LAKEVIEW, MINNESOTA.

HARVESTER.

SPECIFICATION forming part of Letters Patent No. 673,424, dated May 7, 1901.

Application filed August 2, 1899. Renewed October 11, 1900. Serial No. 32,716. (No model.)

*To all whom it may concern:*

Be it known that I, DANIEL T. DENTON, a citizen of the United States, residing at Lakeview, in the county of St. Louis and State of Minnesota, have invented certain new and useful Improvements in Harvesters; and I do hereby declare the following to be a full, clear, and exact description of the invention, such as will enable others skilled in the art to which it appertains to make and use the same.

My invention relates to machines for mowing and reaping grass and grain, the object of the invention being to provide improvements in such machines whereby the usual reciprocating cutter and crank and pitman are dispensed with, doing away with the jarring caused by such reciprocating mechanism, which is so disagreeable to the operator, injurious to the neck of the horses, and productive of hot boxes and general shaking up of the machine.

With this object in view my invention consists in the improved construction, arrangement, and combination of the parts of an endless-chain cutting mechanism for reapers and mowers, as will be fully described hereinafter and afterward specifically pointed out in the appended claims.

Figure 5:
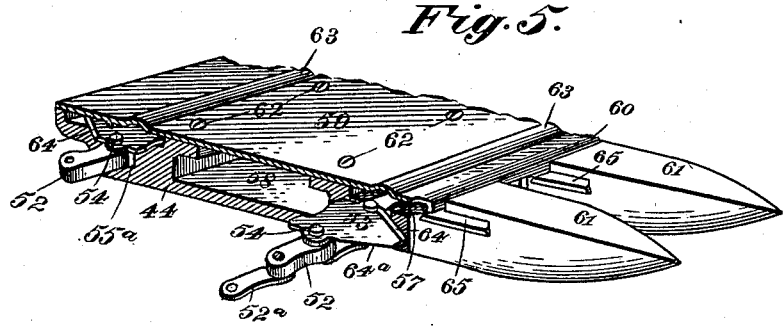
Figure 6:
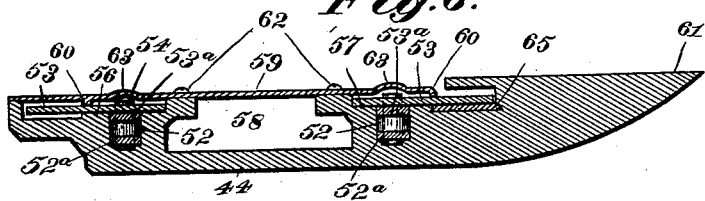
Figure 7:
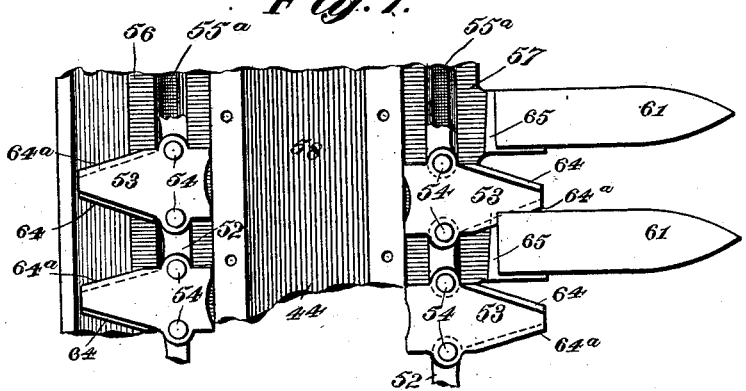

In the accompanying drawings, Figure 1 is a view in side elevation of so much of a mower or reaper as is necessary to illustrate the practical operation of my invention. Fig. 2 is a top plan view thereof with parts broken away. Fig. 3 is a fragmentary detail sectional view of the inner end of the endless sickle or cutter chain, its gearing, and the drag-shoes. Fig. 4 is a sectional detail view of the sprocket on the main shaft or axle. Fig. 5 is a fragmentary perspective sectional view of part of the cutter-bar and endless sickle. Fig. 6 is a transverse sectional view through the same. Fig. 7 is a top plan view of the same with the top plate removed. Fig. 8 is a view in transverse section of the outer end of the cutter-bar and sickle. Fig. 8ª is a detail view showing the slot in the finger-bar. Fig. 9 is a top plan view of the grooved pulley in the end of the cutter-bar with part of the sickle passing around it. Fig. 10 is a fragmentary sectional view of part of the endless sickle. Fig. 11 is a view in side elevation of a slightly-modified form of the endless sickle. Fig. 12 is a detail plan view of one of the cutting-knives detached. Fig. 13 is a detail top plan view of part of the driving mechanism, parts being broken away and parts in section. Fig. 14 is a fragmentary detail sectional view illustrating the cutter-bar horizontal. Fig. 15 is a similar view with the cutter-bar depressed below the horizontal. Fig. 16 is a similar view with the cutter-bar slightly elevated. Fig. 17 is a similar view with the cutter-bar vertical.

Like numerals of reference mark the same parts in all of the figures.

Referring to the drawings by numerals, 15 indicates the tongue of a harvester, which is secured to the upper face of depending brackets 16, in which is journaled the axle 17, upon which are loosely journaled the traction-wheels 18 and 19. The brackets 16 are braced by rods 16ª, connecting them with brackets 16ᵇ, projecting outward and upward from drag-shoe 38, hereinafter referred to. Fixed to the axle are ratchet-wheels 20 and pawls 21, pivotally attached to the wheels, which engage the teeth thereof when the wheels turn forward, thus rotating the axle, but slip over the teeth when the wheels turn backward, leaving the axle at rest.

22 indicates a metallic frame pivotally mounted on the axle 17, to which is secured an extension 23 by means of bolts 24, passing through slots, whereby the extension is adjustable toward and from axle 17.

Within frame 22 upon the axle is secured a gear-wheel 25, which is adapted to engage a pinion 26, secured to or forming part of a gear-wheel 27, both being loosely journaled on a short shaft 28, eccentrically journaled in frame 22 and provided with a lever 29 for turning it. The gear-wheel 27 is adapted to engage a pinion 30, loosely journaled on the axle and forming part of a sprocket-wheel 31. This gear sprocket-wheel may be mounted on ball-bearings 32, as shown in Fig. 4, and is connected by a drive-chain 33 with a sprocket-wheel 34, fixed on a shaft 35, journaled in a bearing 36, secured to the extension 23. The shaft 35 is also journaled in bearing-brackets 37 on a drag-shoe 38, the shaft forming a pivot, upon which the drag-shoe is mounted to swing, and carrying at its outer end a bevel-gear 39.

16$^b$ indicates a bracket attached to the drag-shoe 38, having a bearing to receive the bolt 16$^c$, which connects said bracket 16$^b$ with brace-rod 16$^a$.

40 40 indicate brackets on the drag-shoe 38, which are pivotally secured by bolts 41 to brackets 42 42 on a drag-shoe 43, to which is secured the sickle-bar or cutter-bar 44. In the drag-shoe 43 is fixed a short shaft 45, upon which is journaled a bevel gear-wheel 46, which meshes with the bevel gear-wheel 39 and is formed as part of a sprocket-wheel 47. The teeth of bevel gear-wheels 39 and 46 are formed with curved or convex outer edges and the spaces between them with convex bottoms, and the pivotal bolts 41 are approximately in line with the pitch-lines or center lines of the teeth when they are in mesh with the body of the wheels at right angles to each other, as in Fig. 3. The teeth also project beyond the crowns of the wheels, the result of this construction and arrangement being that the teeth will mesh when the crowns are in contact with each other, as in Fig. 17, and in any other position between that and the one illustrated in Fig. 15, in which the crowns are at an obtuse angle with each other, an instance of an intermediate position being shown in Fig. 16.

The gear sprocket-wheel 46 47 is connected by the endless sickle or cutter chain with a grooved pulley 48, journaled in a drag-shoe 49, dovetailed on the outer end of the cutter-bar and held at any longitudinal adjustment by a set-screw 50. The pulley 48 is mounted on ball-bearings, as shown at 51 in Fig. 9, and its pivot-pin 48$^a$ is in a slot in the cutter-bar.

The endless-sickle chain is composed of links 52, alternating with cutting blades or knives 53, the links being loosely and pivotally connected by pins 54 to the under sides of lugs 55, projecting from the forward and rear sides of the knives, the knives being removable by simply lifting them off the pins. The links 52 are connected at their lower sides by links 52$^a$, and the links 52 and 52$^a$ move in grooves 55$^a$ below the surfaces 56 57 at the edges of the finger-bar 44, while the forward portion of the knives in front of the line of the links slide on the surfaces 56, and the portion in the rear of the line of the links slide on surfaces 57. The rear projecting portions of the cutter-blades run in the groove of pulley 48 at the outer end of the cutter-bar. The cutter-bar is hollowed out longitudinally, as at 58, for purposes of lightness and stiffness, and is covered by a steel plate 59, having downwardly-projecting end flanges 60, by which the cutter-blades are held down upon stationary cutters 65, secured in the fingers 61. The plates are secured to the cutter-bar by screws 62 and formed with ridges 63, rolled upward to afford space below for the accommodation of the pivot-pins of the sickle-chain.

The forward and rear edges of the cutters or knives are inclined in opposite directions, as at 64 and 64$^a$, rendering them reversible by simply turning them over, a sharpened edge being down and facing forward in both of these positions. The stationary cutter-plates 65 are dovetailed in the fingers in position to coact with the knives. The stationary cutter-plates and their dovetail grooves are tapered, being widest at their cutting edges, so that the action of the knives will always tend to keep them tight. These cutting-plates may be removed and sharpened whenever desired, and on account of the sickle-chain always moving in the same direction and at a high speed the fingers may be placed very close together and the knives made much smaller than when the size of the knives and distance apart of the fingers are dependent upon the throw of a pitman.

There is a bracket 66 depending from the tongue 15, extending downward and to one side, the lower end being connected to the front of the drag-shoe 43 by a short chain 67 to bring part of the direct draft upon the shoe and permit of the sweep of the cutter-bar on its pivot. The whiffletrees 68 are pivoted in a bracket or clevis 69, which in turn is pivoted to bracket 66.

In Fig. 10 I have shown a detail section of part of the endless sickle, by which it will be seen that the sickle consists of the bottom links 52$^a$, in which the pins 54 are secured, the links 52 connecting the links 52$^a$ by being secured on the pins 54, and the cutting-knives slipped loosely upon the pins, overlapping the ends of links 52 and directly over the links 52$^a$. In Fig. 11 I show the same construction, with the addition of top links 53$^a$ on pins 54 immediately under the cutting-knives, the knives being, as in Fig. 10, slipped loosely upon the pins. By means of this construction the knives can be removed at any time by simply removing a section of the covering-plate 59 and slipping them off the pins.

By providing the cutting-knives with cutting edges at the bottom of their front edges and at the top of their rear edges they may be made to do double service by simply reversing them on the pin.

When operating the machine, a supply of double-edged knives may be prepared and kept on hand, so that the machine may be run for a long time before it becomes necessary to stop for the purpose of grinding the knives.

The details of the pulley 48 are shown in Figs. 8 and 9, in which the drag-shoe 49 is dovetailed on the cutter-bar 44, the pivot-pin 48$^a$ being secured at its upper end in the shoe and passed into a slot in the cutter-bar at its lower end. The pulley is in the form of a ring with a V-groove in its interior, which groove with corresponding grooves in the exterior of cones or hubs 51ª and 51ᵇ, form a race for bearing-balls 51, the hub or cone 51ᵇ being threaded on the pivot-pin 48ª, whereby the size of the race may be varied to assure perfect operation.

By the construction and arrangement of the various parts, as hereinbefore described, it will be seen that I have provided a simple, cheap, and effective endless-sickle chain cutting-harvester, and while I have illustrated and described what I consider at this time to be the preferred details of construction I desire it to be understood that many slight changes and variations might be made by the ordinary mechanic after inspecting my specification which would be clearly included within the limit and scope of my invention.

Having thus fully described my invention, what I claim as new is—

1. The combination with a finger-bar provided with longitudinal grooves in its upper surface near each side, and a covering-plate for said grooves, of a sprocket-wheel at one end, a grooved pulley at the other, and an endless-sickle chain comprising links, composed of top and bottom plates or bars, running in the grooves in the bar, and alternating cutting-blades projecting to the front and rear of the links and running on the surface of the finger-bar in front and rear, the rear projection also running in the groove of the pulley at the end of the finger-bar, substantially as described.

2. The combination with a finger-bar provided with a sprocket-wheel at its inner end, of a shoe at the outer end dovetailed on the finger-bar, a set-screw for securing it at any adjustment, a grooved pulley journaled in the shoe, and an endless-sickle chain running on the sprocket-wheel and pulley, substantially as described.

3. The herein-described endless sickle comprising bottom links carrying upright pivot-pins at each end, connecting-links mounted on the pins with their ends overlapping the ends of the bottom links, and cutting-knives loosely slipped over the upper ends of said pins directly over the bottom links.

4. The herein-described endless sickle comprising bottom links carrying upright pivot-pins at each end, connecting-links mounted on the pins with their ends overlapping the ends of the bottom links, top links mounted on the pins directly over the bottom links, and cutting-knives loosely slipped over the upper ends of said pins directly over the top links.

5. The combination with the finger-bar having its outer end of dovetail shape and provided with a longitudinal slot, of a drag-shoe dovetailed on the end of the finger-bar, a pivot-pin secured to the drag-shoe and playing in said slot, grooved cones or hubs one above the other on said pin, the upper cone being threaded on the pin, a ring-shaped exteriorly-grooved pulley having a V-shaped groove in its interior, and bearing-balls mounted in the race formed by the grooves of the cones and the interior groove of the ring-shaped pulley substantially as described.

6. The combination with a finger-bar and fingers, of tapering stationary knives dovetailed in the fingers along lines transverse to the fingers and an endless-sickle chain with knives sharpened on their advance sides acting in conjunction with said stationary knives, whereby the continuous movement of the chain in one direction keeps the stationary knives tight, substantially as described.

7. The combination with the drag-shoe 38, the driven shaft 35 thereon, and the bevel gear-wheel 39 on the shaft, of a second drag-shoe 43 at the inner end of the cutter-bar, a short shaft 45 thereon, a bevel-wheel 46 on the shaft, said bevel-wheels 39 and 46 being provided with flat crowns and curved teeth projecting beyond the crowns, brackets 40 42 on the drag-shoes 38 and 43 and pivotal pins 41 connecting the brackets in line with the pitch-lines or center lines of the teeth of the bevel gear-wheels, where they project beyond the crown, substantially as described.

In testimony whereof I affix my signature in presence of two witnesses.

DANIEL T. DENTON.

Witnesses:
A. B. LOUTZENHISER,
E. J. BURGET.